(12) United States Patent
Buranov

(10) Patent No.: US 8,573,523 B2
(45) Date of Patent: Nov. 5, 2013

(54) AUTOMATIC AND CONTINUOUS RUBBER EXTRACTING DEVICE FOR EXTRACTING RUBBER FROM A RUBBER-BEARING PLANT MATERIAL

(75) Inventor: Anvar Buranov, Surrey (CA)

(73) Assignee: KOK Technologies Inc., Surrey (CA)

( * ) Notice: Subject to any disclaimer, the term of this patent is extended or adjusted under 35 U.S.C. 154(b) by 402 days.

(21) Appl. No.: 12/957,171

(22) Filed: Nov. 30, 2010

(65) Prior Publication Data
US 2011/0240776 A1 Oct. 6, 2011

Related U.S. Application Data

(60) Provisional application No. 61/319,240, filed on Mar. 30, 2010.

(51) Int. Cl.
*B02C 7/08* (2006.01)
(52) U.S. Cl.
USPC ...... 241/246; 241/248; 241/257.1; 241/261.2
(58) Field of Classification Search
USPC ............... 241/246–248, 257.1, 261.2, 261.3, 241/296–298
See application file for complete search history.

(56) References Cited

U.S. PATENT DOCUMENTS

| | | |
|---|---|---|
| 755,989 A | 3/1904 | Baker et at. |
| 1,159,137 A | 11/1915 | Vecchini |
| 3,387,796 A | 6/1968 | Cormack et al. |
| 3,902,673 A | 9/1975 | Berggren |
| 4,022,388 A | 5/1977 | Schnitzer |
| 4,034,921 A | 7/1977 | Schnitzer |
| 4,037,798 A | 7/1977 | Schnitzer |
| 4,136,131 A | 1/1979 | Buchanan |
| 4,290,560 A | 9/1981 | Tabah |
| 4,739,037 A | 4/1988 | Kay et al. |
| 5,042,726 A * | 8/1991 | Reinhall .......................... 241/28 |
| 5,626,300 A * | 5/1997 | Kohler .......................... 241/247 |
| 6,227,471 B1 | 5/2001 | Virving |
| 6,250,573 B1 | 6/2001 | Kriebel et al. |
| 7,540,438 B2 | 6/2009 | Buranov |

FOREIGN PATENT DOCUMENTS

GB 517699 2/1940

* cited by examiner

Primary Examiner — Mark Rosenbaum
(74) Attorney, Agent, or Firm — Cameron IP

(57) ABSTRACT

An automatic and continuous rubber extracting device comprises a first grinding stone having a central opening and second grinding stone rotatable mounted against the first grinding stone. The first grinding stone is a top stone and the second grinding stone is a bottom stone. A cone is disposed within the central opening of the first grinding stone. A motor apparatus is provided for rotating the bottom stone and the cone. A screw feed is in communication with the central opening of the first grinding stone. Plant material from the screw feed is fed along the cone and between the first grinding stone and second grinding stone. The cone may be provided with grooves and recesses along an lateral surface thereof.

16 Claims, 12 Drawing Sheets

AUTOMATIC AND CONTINUOUS RUBBER EXTRACTING DEVICE FOR EXTRACTING RUBBER FROM A RUBBER-BEARING PLANT MATERIAL

CROSS-REFERENCE TO RELATED APPLICATION

This application claims the benefit of provisional application 61/319,240 filed in the United States Patent and Trademark Office on Mar. 30, 2010, the full disclosure of which is incorporated herein by reference and priority to which is claimed.

BACKGROUND OF THE INVENTION

1. Field of the Invention

The present invention relates to extracting rubber from rubber-bearing plant material and, in particular, to an automatic and continuous rubber extracting device for extracting rubber from rubber-bearing plant material in dry conditions.

2. Description of the Related Art

It is known to use a rubber extracting device to extract rubber from rubber-bearing plant material in non-aqueous conditions. For example, U.S. Pat. No. 7,540,438 issued on Jun. 2, 2009 to Buranov and the full disclosure of which is incorporated herein by reference, discloses a process for extracting rubber which includes first drying rubber-bearing plant material and then mechanically grinding the rubber-bearing plant material with a gristmill or similar equipment to produce rubber threads and finely ground root tissue. Following the mechanical grinding, rubber threads are separated from finely ground plant root tissue by passing the ground plant material over a dry vibrating mesh screen and blowing away the finely ground plant root tissue to leave rubber threads. The rubber threads may be further purified by stirring the rubber threads in warm water and skimming off the rubber threads.

There is accordingly a need for an improved rubber extracting device to mechanically grind organic material and, in particular, rubber-bearing plant material to produce rubber threads and finely ground root tissue.

SUMMARY OF THE INVENTION

It is an object of the present invention to provide an improved device for mechanically grinding organic material.

It is another object of the present invention to provide an improved rubber extracting device to mechanically grind rubber-bearing plant material to produce rubber threads and finely ground root tissue in dry conditions.

A first embodiment of the device comprises a first grinding disk having a central opening and second grinding disk disposed adjacent to and against the first grinding disk. A substantially cone shaped member is disposed within the central opening of the first grinding disk. The cone shaped member has a base edge which engages a nip opening between the first grinding disk and the second grinding disk. A motor apparatus is provided for engaging and rotating the cone shaped member and at least one of the first grinding disk and the second grinding disk. A feed tube with an auger disposed therein is in communication with the central opening of the first grinding disk. Organic material fed from the feed tube by the auger is moved along a lateral surface of the cone shaped member and between the first grinding disk and the second grinding disk.

A second embodiment of the device comprises a first grinding disk having a central opening and second grinding disk disposed adjacent to and against the first grinding disk. A substantially cone shaped member is disposed within the central opening of the first grinding disk. A motor apparatus is provided for engaging and rotating the cone shaped member and at least one of the first grinding disk and the second grinding disk. A scraper is mounted on an apex of the cone shaped member. The output shaft is coupled to the scraper and causes the scraper to be moved along a lateral surface of cone shaped member. A telescoping feed tube is in communication with the central opening in the first grinding disk. The telescoping feed tube includes an outer feed tube and an inner feed tube. The outer feed tube is in communication with an input conduit. The inner feed tube has a lateral opening which is aligned with the input conduit to allow material to be fed to the device when the inner feed tube is substantially retracted within the outer feed tube. However, the input conduit cannot communicate with the inner feed tube and material cannot be fed to the device through the input conduit when the inner feed tube extends outwardly of the outer feed tube. Organic material fed from the telescoping feed tube is moved along a lateral surface of the cone shaped member and between the first grinding disk and the second grinding disk. The input conduit may extend angularly from the outer feed tube.

A third embodiment of the device comprises a first grinding disk having a central opening and second grinding disk disposed adjacent to and against the first grinding disk. A substantially cone shaped member is disposed within the central opening of the first grinding disk. A groove extends along a lateral surface of the cone shaped member from an apex of the cone shaped member to a base edge of the cone shaped member. There is also an elongate recess in the lateral surface of the cone shaped member. The elongate recess extends generally perpendicular to the groove. A motor apparatus is provided for engaging and rotating the cone shaped member and at least one of the first grinding disk and the second grinding disk. A feed tube with an auger disposed therein is in communication with the central opening of the first grinding disk. Organic material fed from the feed tube by the auger is moved along a lateral surface of the cone shaped member and between the first grinding disk and the second grinding disk. The auger may be mechanically coupled to the cone shaped member and rotate with the cone shaped member.

A fourth embodiment of the rubber extracting device comprises a first grinding disk having a central opening and second grinding disk disposed adjacent to and against the first grinding disk. A substantially cone shaped member is disposed within the central opening of the first grinding stone. A motor apparatus is provided for engaging and rotating the cone shaped member and at least one of the first grinding disk and the second grinding disk. A blade is mechanically coupled to the either the cone shaped member or the output shaft, and rotates with the cone shaped member. A feed tube with an auger disposed therein is in communication with the central opening of the first grinding disk. The auger is also mechanically coupled to the either the cone shaped member or the output shaft, and rotates with the cone shaped member. Organic material fed from the feed tube by the auger is moved along a lateral surface of the cone shaped member and between the first grinding disk and the second grinding disk. The auger may not be needed to feed the organic material through the feed tube if the organic material is cut into smaller pieces or chips.

Further embodiments of the device include at least the following features a first grinding disk having a central opening and second grinding disk disposed adjacent to and against the first grinding disk; a substantially cone shaped member disposed within the central opening of the first grinding disk; a motor having an output shaft is provided for engaging and rotating the cone shaped member and at least one of the first grinding disk and the second grinding disk; and a feed tube in communication with the central opening of the first grinding disk. The further embodiments may also include one of the following features: an auger; a blade; a groove in at least one of the grinding disks; a groove in a lateral surface of the cone shaped member; a recess in a lateral surface of the cone shaped member; or any combination thereof.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
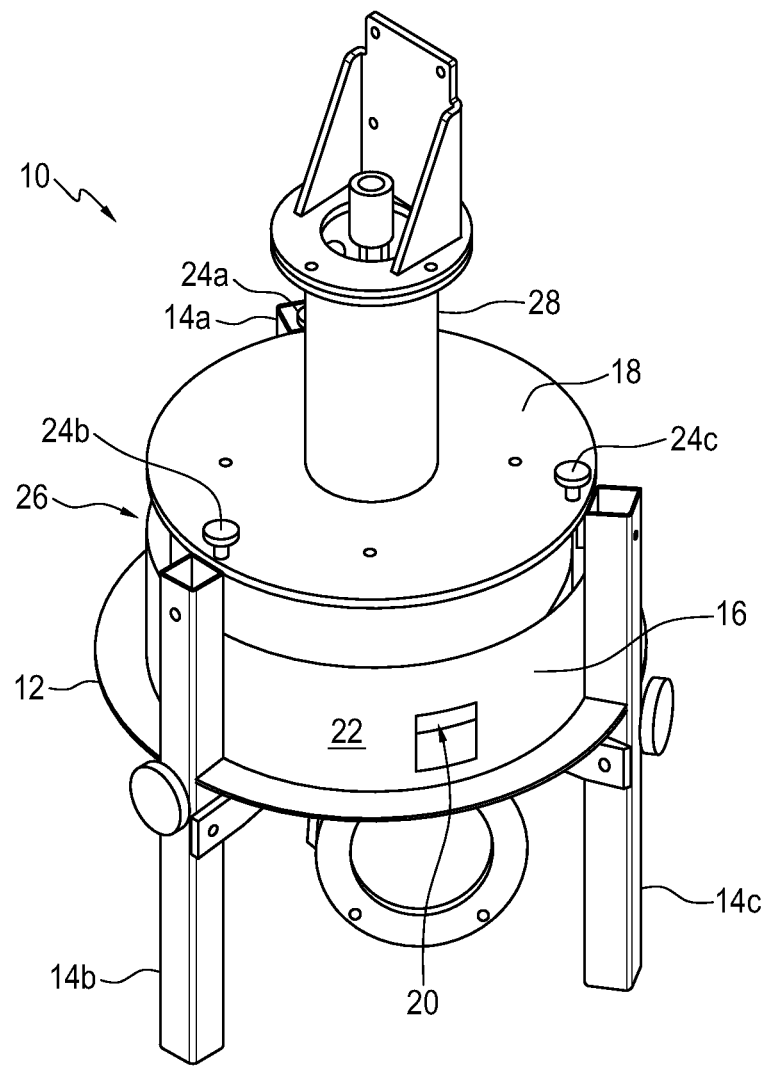
FIG. 1 is a side perspective view of a first embodiment of an improved rubber extracting device.
Figure 2:
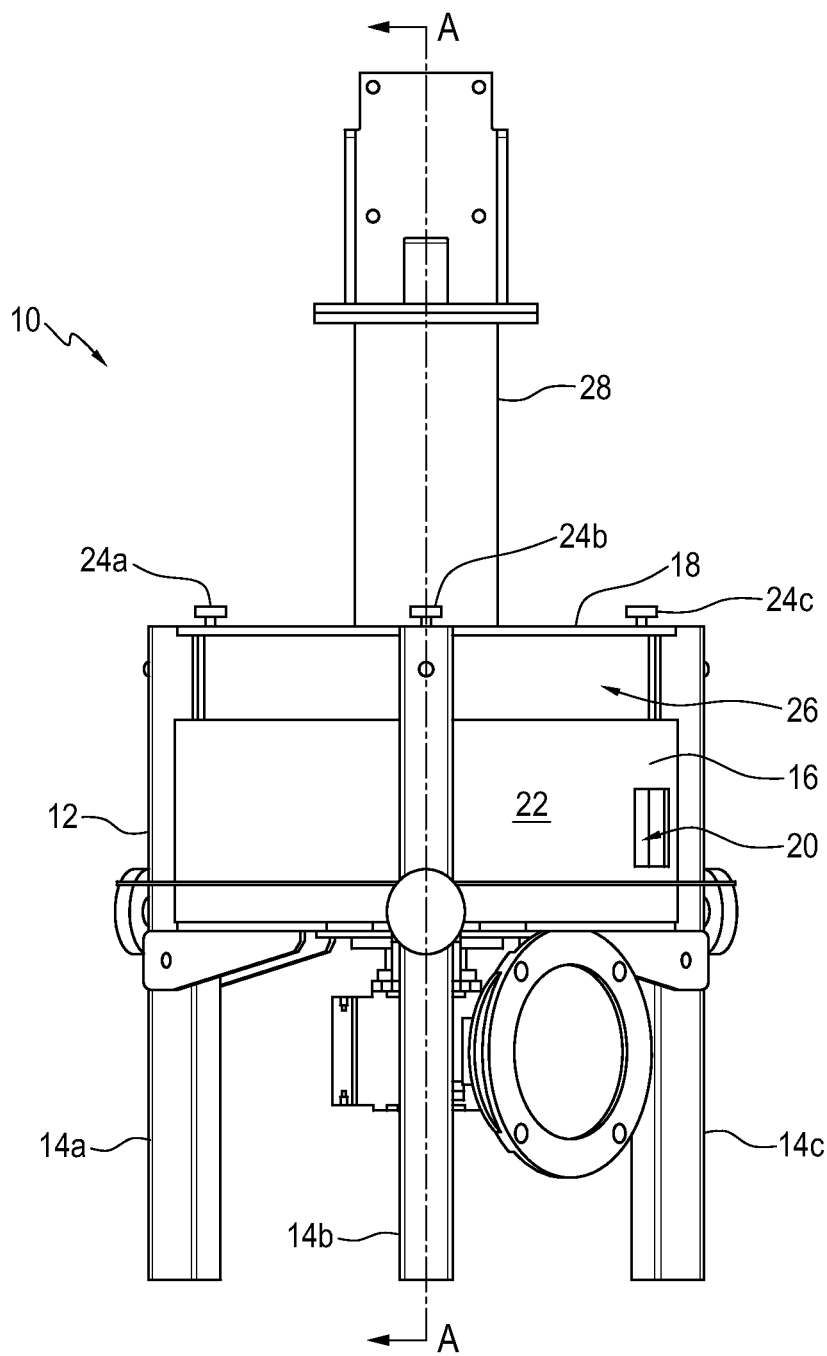
FIG. 2 is a side elevation view of the device of FIG. 1.

Referring to the drawings and first to FIGS. 1 and 2, there is shown a first embodiment of an improved rubber extracting device 10 for mechanically grinding rubber-bearing plant material to produce rubber threads and finely ground root tissue. The rubber extracting device 10 generally includes frame 12 having three legs 14a, 14b and 14c which support a housing body 16 and a housing cover 18. There is an opening 20 in an annular wall 22 of the housing body 16. Screws 24a, 24b and 24c secure the housing cover 18. The screws are adjustable and may be used to vary a force applied by the housing cover 18 to internal components within the housing body 16. In this example, the housing cover 18 is above and spaced-apart from the housing body 16. This defines an annular opening 26 in the rubber extracting device 10. A screw feeder 28 extends upwards from the housing cover 18.

Figure 3:
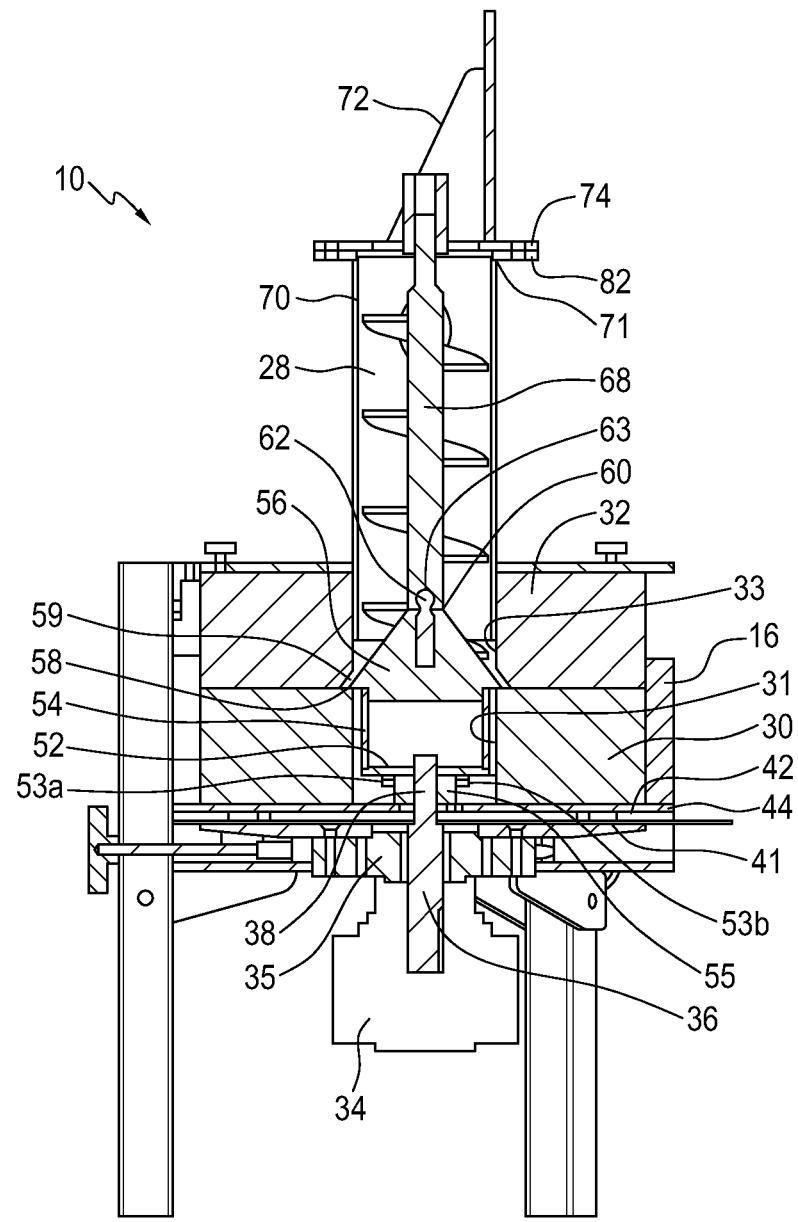
FIG. 3 is a sectional view taken along lines A-A of FIG. 2.
Figure 4:
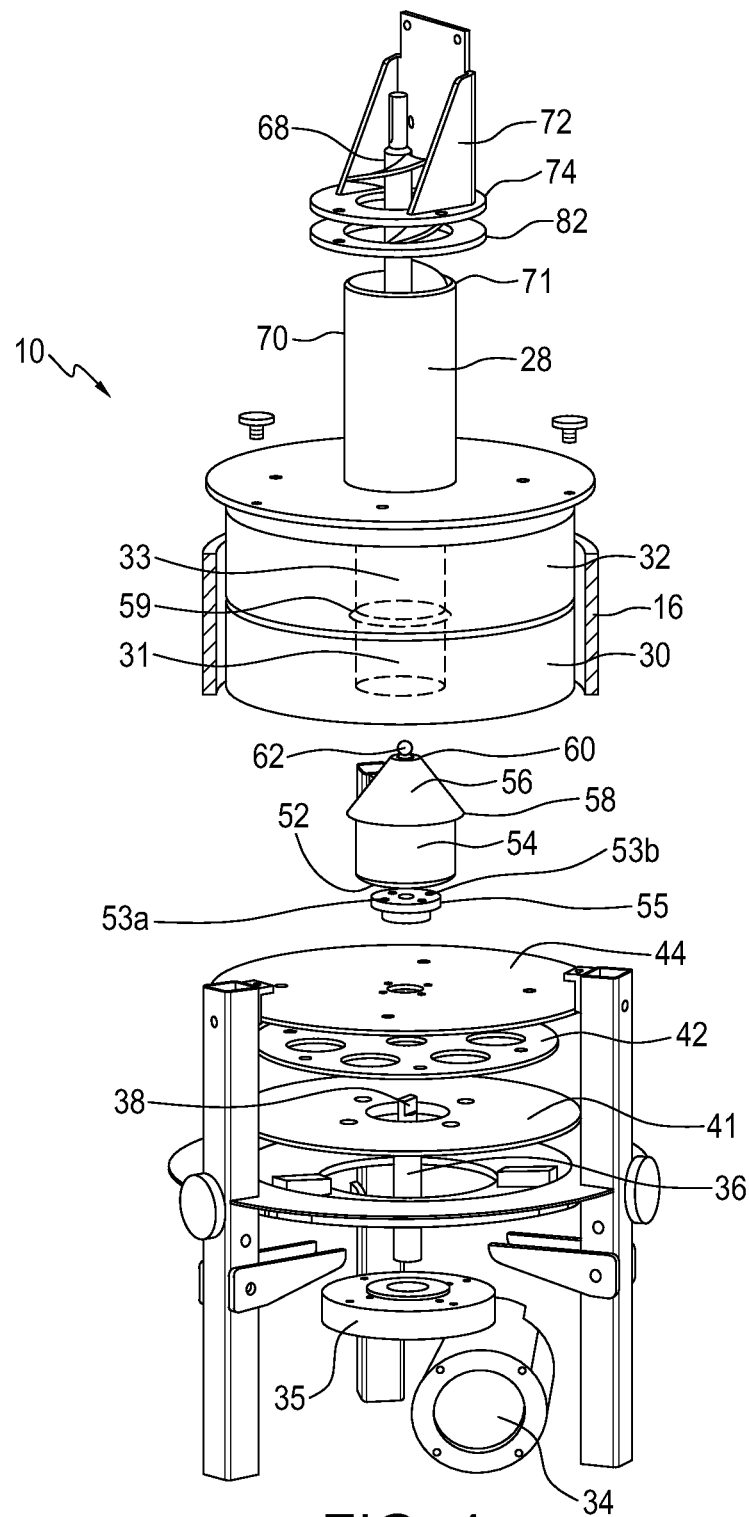
FIG. 4 is an exploded, partially sectional view, of the device of FIG. 1.
Figure 5:
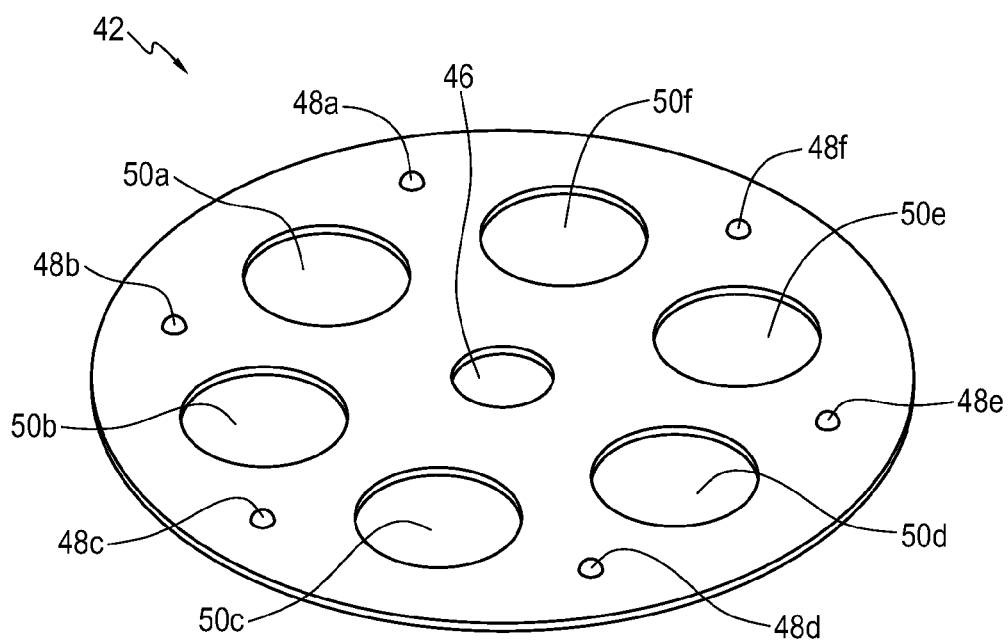
FIG. 5 is a top perspective view of a bearing plate of the device of FIG. 1.

As best shown in FIGS. 3 and 4, there is a pair of grinding stones or disks 30 and 32 disposed within the housing body 16. At least one of the disks is rotatable relative to the other one of the disks. In this example, a motor 34 rotates a bottom disk 30 while a top disk 32 remains stationary. The motor 34 includes gear box 35 with an output shaft 36 having a distal end 38. The device 10 is provided with a support plate 41 which supports a bearing plate 42 and a bottom 44 of the housing body 16. The bottom disk 30 sits on the bottom 44 of the housing body. The bearing plate 42 is best shown in FIG. 5 and is provided with a center opening 46 through which the output shaft 36, shown in FIGS. 3 and 4, extends. The bearing plate 42 is further provided with a plurality of ball bearings 48a, 48b, 48c, 48d, 48e and 48f, circular in this example, arranged in an annular formation. There is also a plurality of openings 50a, 50b, 50c, 50d, 50e and 50f arranged in an annular formation. In this example, the ball bearings are interposed between the openings.

Figure 6:
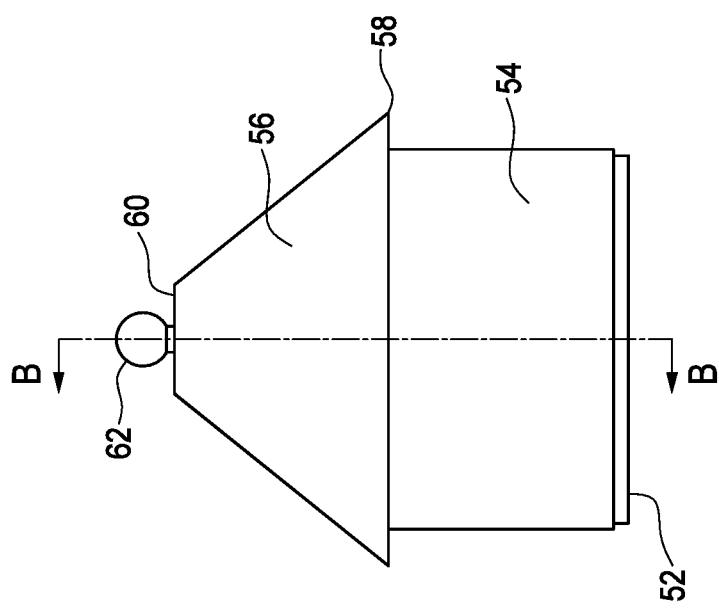
FIG. 6 is a side elevation view of a cone disk drive, cone tube and truncated cone of the device of FIG. 1.
Figure 8:
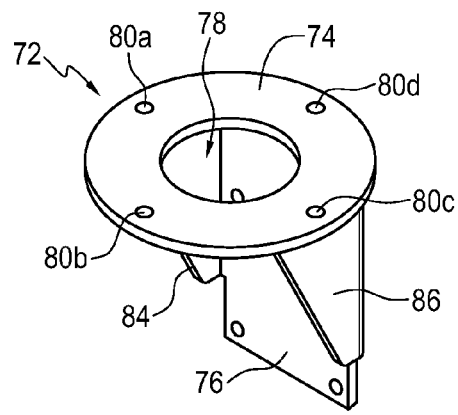
FIG. 8 is a bottom perspective view of a motor mount of the device of FIG. 1.
Figure 9:
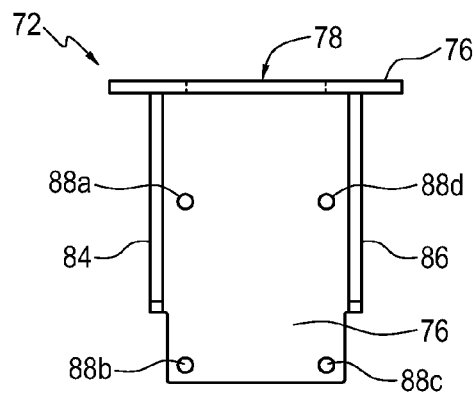
FIG. 9 is a front elevation view of the motor mount of FIG. 8.
Figure 10:
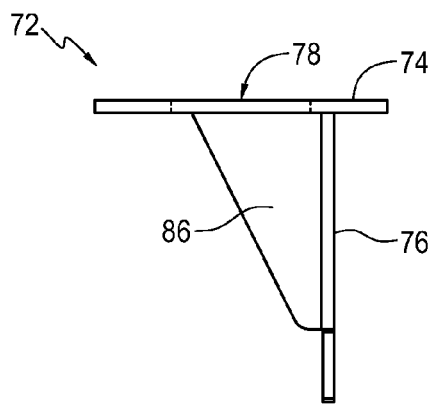
FIG. 10 is a side elevation view of the motor mount of FIG. 8.
Figure 11:
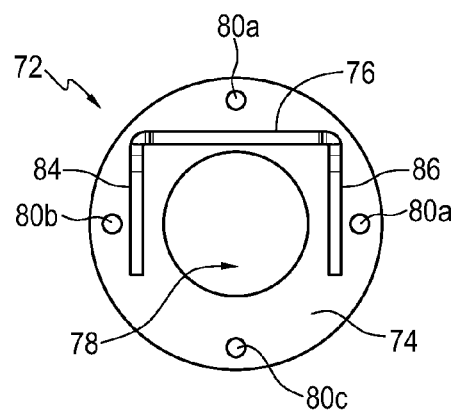
FIG. 11 is a top plan view of the motor mount of FIG. 8.

Referring back to FIGS. 3 and 4, the output shaft 36 engages a cone drive disk 52. The cone drive disk 52 engages a cone tube 54 which receives a substantially cone shaped member in the form of a truncated cone 56. The cone disk drive 52, cone tube 54 and truncated cone 56 are shown in greater detail in FIGS. 6 and 7. As shown in FIG. 3, the cone drive disk 52 is disposed in a central opening 31 in the bottom disk 30 and sits on bearings 53a and 53b which are disposed on a drive hub 55. The drive hub 55 is mounted on the bottom 44 of the housing 16 and transmits rotary motion to the bottom 44 of the housing 16 which causes the bottom stone 30 to rotate.

Figure 7:
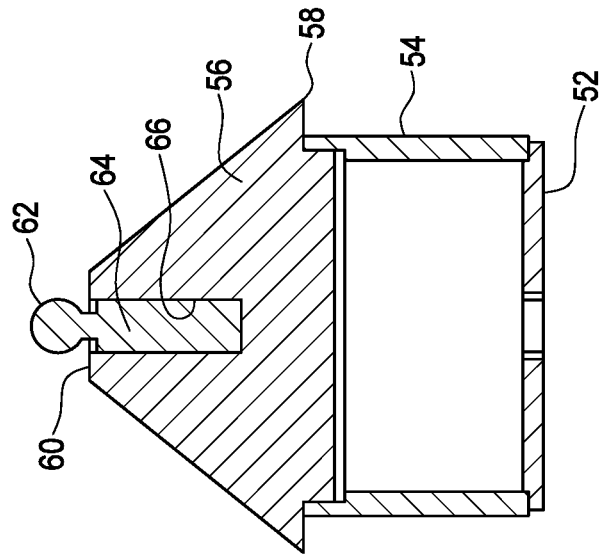
FIG. 7 is sectional view taken along lines B-B of FIG. 6.

The cone drive disk 52 transmits rotary motion to the cone tube 54 which is also disposed in the central opening of the bottom disk 30. The cone tube 54 in turn transmits rotary motion to the truncated cone 56, thereby rotating the truncated cone 56. The truncated cone 56 is disposed within a central opening 33 in the top disk 32. A bottom edge 58 of the truncated cone 56 coincides with a nip opening 59 between the disks 30 and 32. This allows dried rubber-bearing plant material (not shown) to be fed between the disks 30 and 32. A top 60 of the truncated cone 56 is provided with a protrusion 62. As shown in FIG. 7 and with reference to FIG. 6, in this example, the protrusion 62 is knob-like and forms a distal end of an elongated member 64. The elongate member 64 pressed into an aperture 66 in the truncated cone 56.

Referring back to FIGS. 3 and 4, the protrusion 62 engages a socket 63 of an auger 68 of the screw feeder 28. The auger 68 is disposed within a feed tube 70 and may rotate independently of the truncated cone 56 via relative rotation between the protrusion 62 and the socket 63. There is a motor mount 72 disposed at a distal or upper end 71 of the feed tube 70. The motor mount 72 has a flange 74 which mates with a corresponding flange 82 at the distal end 71 of the feed tube 70. The motor mount 72 is shown in greater detail in FIGS. 8 to 11 and generally includes the flange 74 and mounting plate 76. The flange 74 is provided is with a center opening 78 and a plurality of smaller openings 80a, 80b, 80c and 80d disposed about a periphery thereof. Bolts may be received by the smaller openings 80a, 80b, 80c and 80d the flange 74 to secure the motor mount 72 to the feed tube 70, as shown in FIG. 3. The center opening 78 in the flange 74 of the motor mount 72 allows for communication with the feed tube 70. Referring back to FIGS. 8 to 11, the mounting plate 76 extends substantially perpendicular from the flange 74 of the motor mount 72. A pair of opposed webs 84 and 86 extending between the flange 74 of the motor mount 72 and the mounting plate 76 provide support to the mounting plate 76. The mounting plate is provided with a plurality of openings 88a,

88b, 88c and 88d which allow a motor (not shown) to be bolted to the mounting plate 76.

In operation, dried rubber-bearing plant material is conveyed to the screw feeder 28. The auger 68 drives the rubber-bearing plant material towards the truncated cone 64. The rubber-bearing plant material is moved along the truncated cone 56 to the nip opening 59 between the disks 30 and 32. Dried rubber-bearing plant material is thereby fed between the disks 30 and 32. Providing grooves along an outer wall of the truncated cone may facilitate moving rubber-bearing plant material along the truncated cone 64 to the nip opening 59 between the disks 30 and 32.

The rubber-bearing plant material is mechanically ground to produce rubber threads and finely ground root tissue as the bottom disk 30 is rotated relative to the stationary top disk 32. The rubber threads and finely ground root tissue are expelled through the opening 20 in an annular wall 22 of the housing body 16. The rubber threads may be separated from finely ground plant root tissue by passing the ground plant material over a dry vibrating mesh screen and blowing away the plant root skins to leave rubber threads. The rubber threads may further be purified by stirring the rubber threads in warm water and skimming off the rubber threads.

Figure 12:
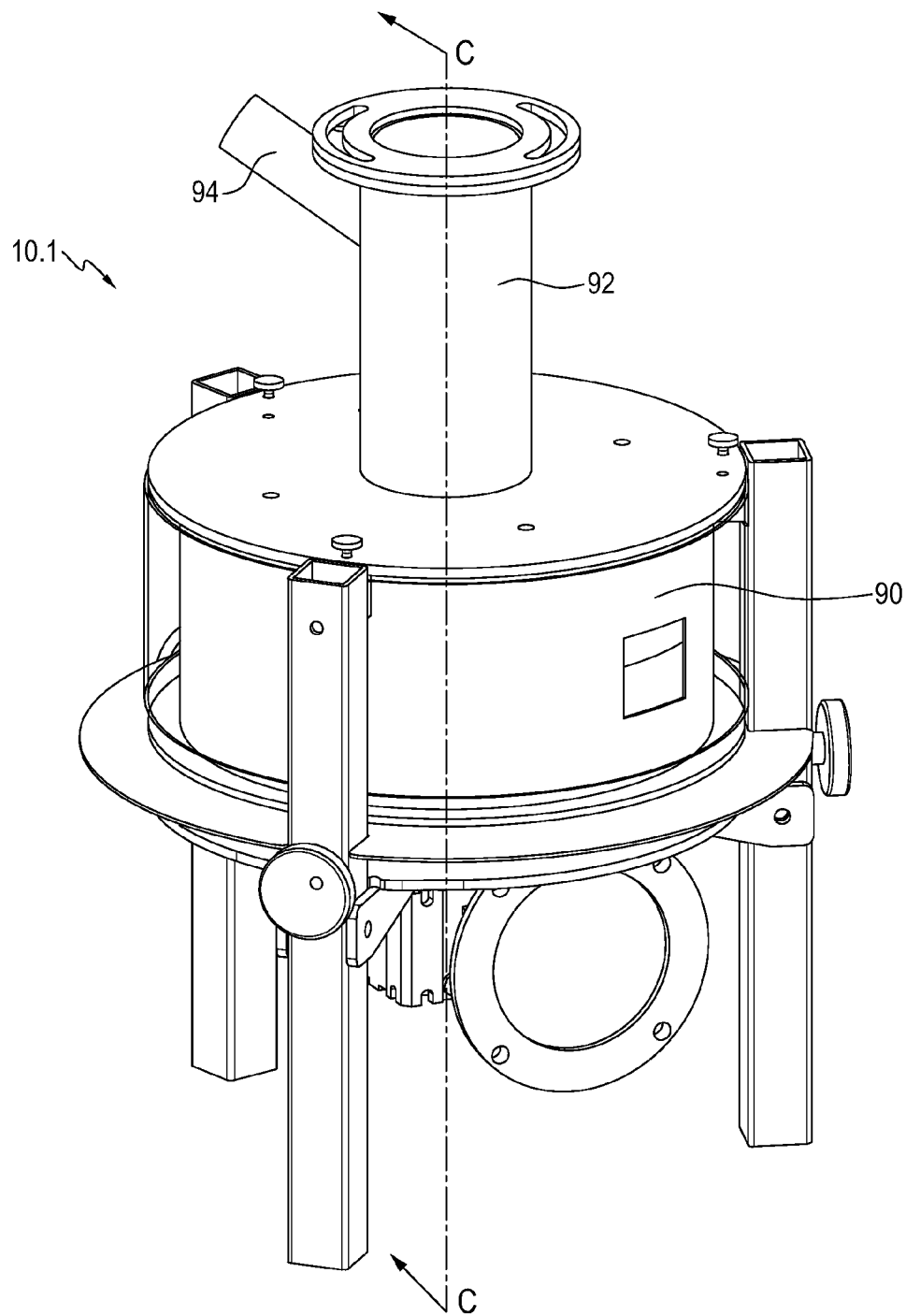
FIG. 12 is a side perspective view of a second embodiment of an improved rubber extracting device.
Figure 13:
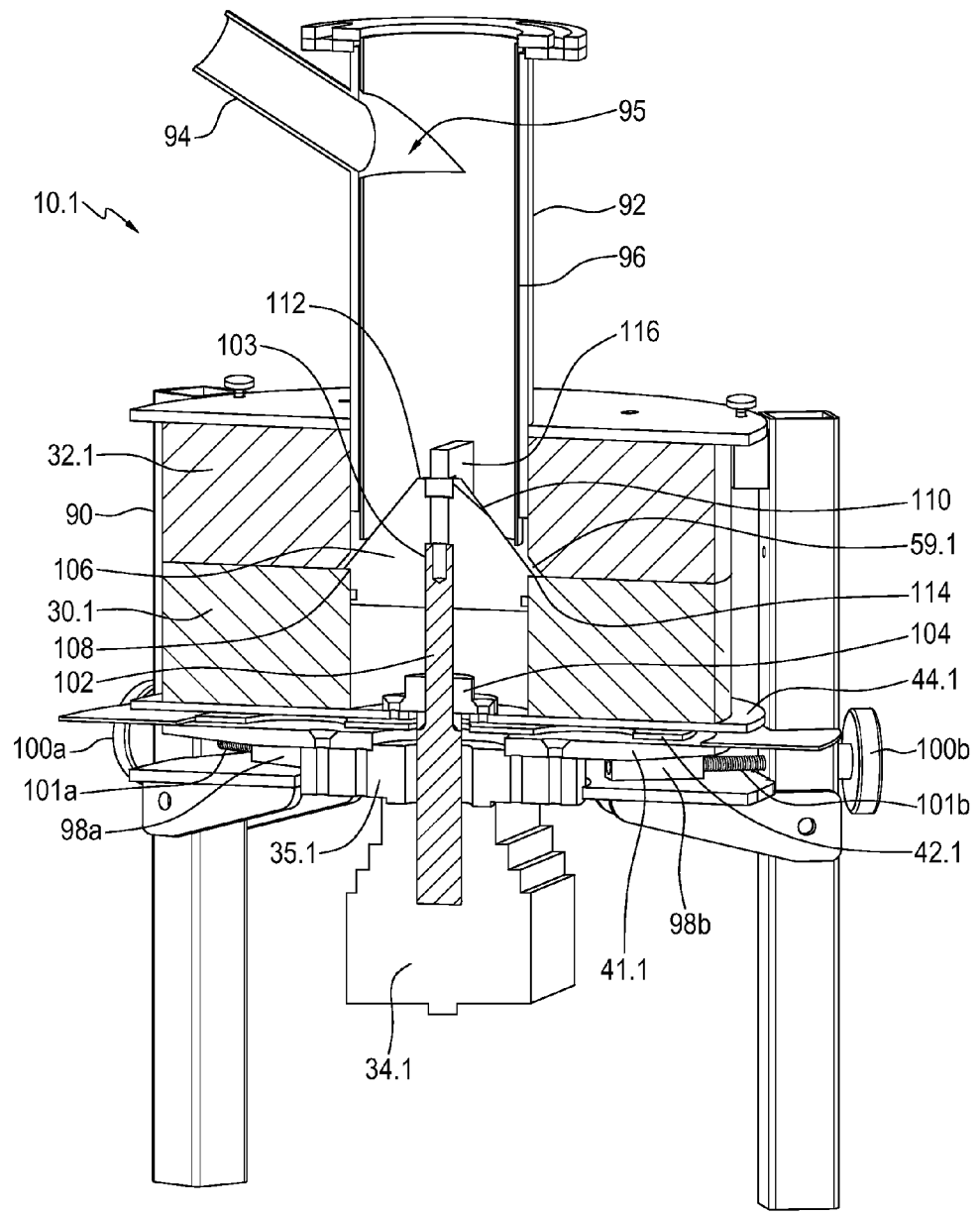
FIG. 13 is a sectional view taken along lines C-C of FIG. 12.
Figure 14:
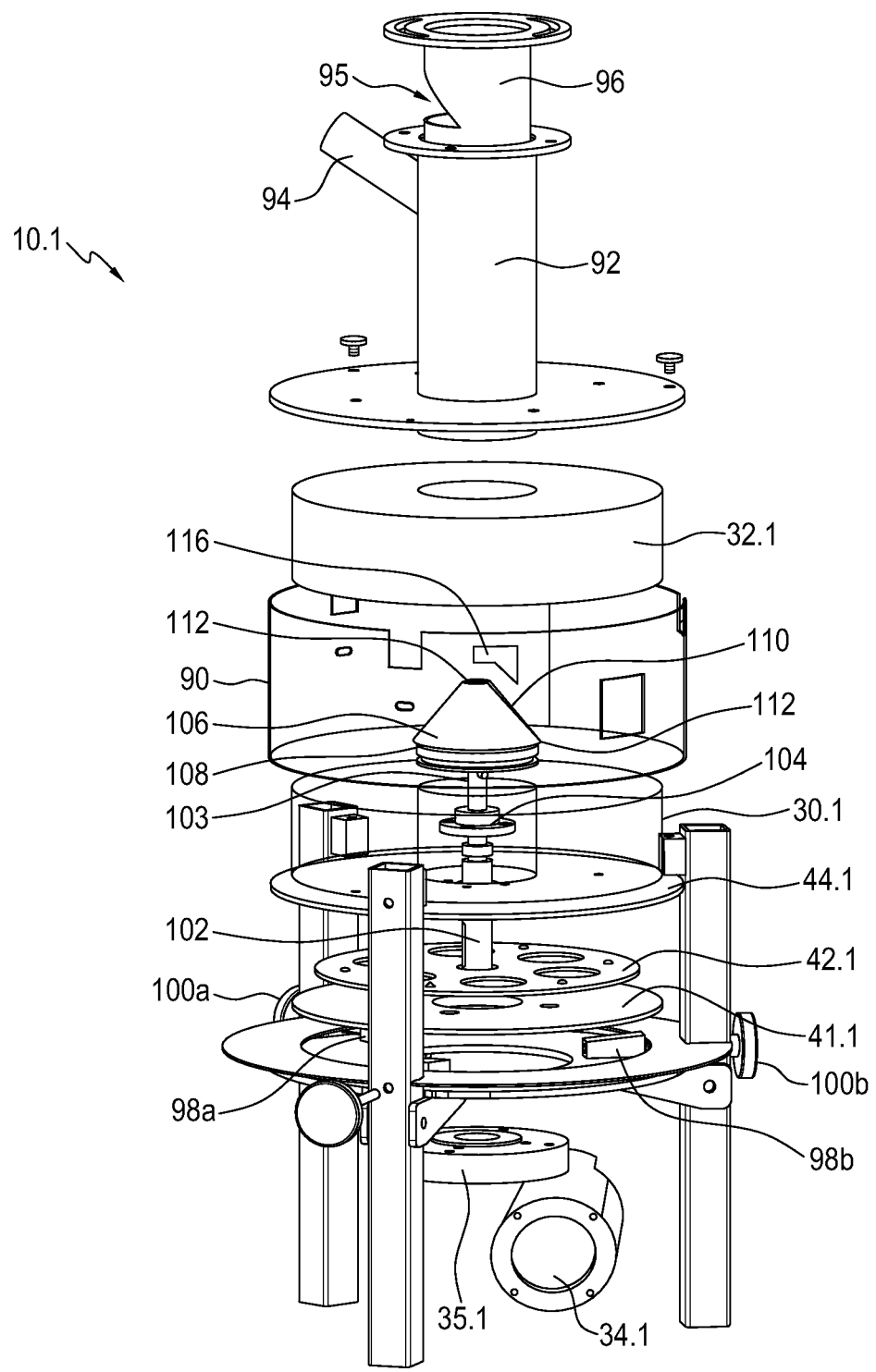
FIG. 14 is an exploded view of the device of FIG. 12 with a housing body thereof being shown as transparent to reveal interior components.

A second embodiment of the improved rubber extracting device 10 is shown in FIGS. 12 to 14. The second embodiment of the rubber extracting device 10.1 is generally similar in structure and function to the first embodiment of the rubber extracting device 10 shown in FIGS. 1 to 4 and like parts have been given like reference numerals in FIGS. 12 to 14 with the additional numerical designation "0.1". However, the second embodiment of the rubber extracting device 10.1 is provided with a housing body 90 which substantially encases the pair of grinding disks 30.1 and 32.1. The second embodiment of the device 10.1 is also further provided with a pair of telescoping feed tubes 92 and 96. The outer feed tube 92 is in communication with an input conduit 94 which, in this example, extends angularly upwards from the outer feed tube 92. There is a lateral opening 95 in the inner feed tube 96 which is aligned with the input conduit 94 when the inner feed tube 96 is substantially retracted within the outer feed tube 92, as best shown in FIG. 13. When the inner feed tube 96 extends outwardly of the outer feed tube 94, as best shown in FIG. 14, the input conduit 94 cannot communicate with the inner feed tube 96 and material cannot be fed to the device 10.1 through the input conduit 94.

As shown in FIGS. 13 and 14, there is a plurality of angularly spaced-apart wedge members 98a and 98b disposed below the support plate 41.1. Each of the wedge members 98a and 98b is coupled to a corresponding knob 100a and 100b, respectively, via threaded members 101a and 101b which threadedly engage corresponding threaded openings in the wedge members. Rotation of the knobs accordingly causes the wedges to move towards or away from the output shaft 102 of the device 10.1. Movement of the wedge members 98a and 98b towards the output shaft 102 increases a force applied to the bearing plate 42.1 and the housing bottom 44.1, while movement of the wedge members away from the output shaft decreases the force applied to the bearing plate and housing bottom. A varying force can accordingly be applied to the housing bottom 44.1.

In the second embodiment of the device 10.1 the output shaft 102 is held in position by a drive hub 104 and directly engages a truncated cone 106. The drive hub 104 transmits rotary motion imparted by motor 34.1 and gear box 35.1 to the bottom disk 30.1 as described above for the first embodiment of the device. However, there is no cone drive disk or cone drive in the second embodiment of the device 10.1. Rather the truncated cone 106 has a flange 108 which sits on the bottom grinding disk 30.1. The truncated cone 106 also has a groove 110 extending along the lateral surface thereof. The groove 110 extends from an apex 112 of the truncated cone to the bottom edge 114 thereof. The groove 110 facilitates movement of rubber-bearing plant material along the lateral surface of the truncated cone 106 to the nip opening 59.1 between the disks 30.1 and 32.1. Movement of rubber-bearing plant material along the lateral surface of the truncated cone is also facilitated by a scraper 116. The scraper 116 is engaged with a distal end 103 of the output shaft 102 which transmits rotary motion to the scraper and causes the scraper to move or rotate along the lateral surface of the truncated cone 106.

Figure 15:
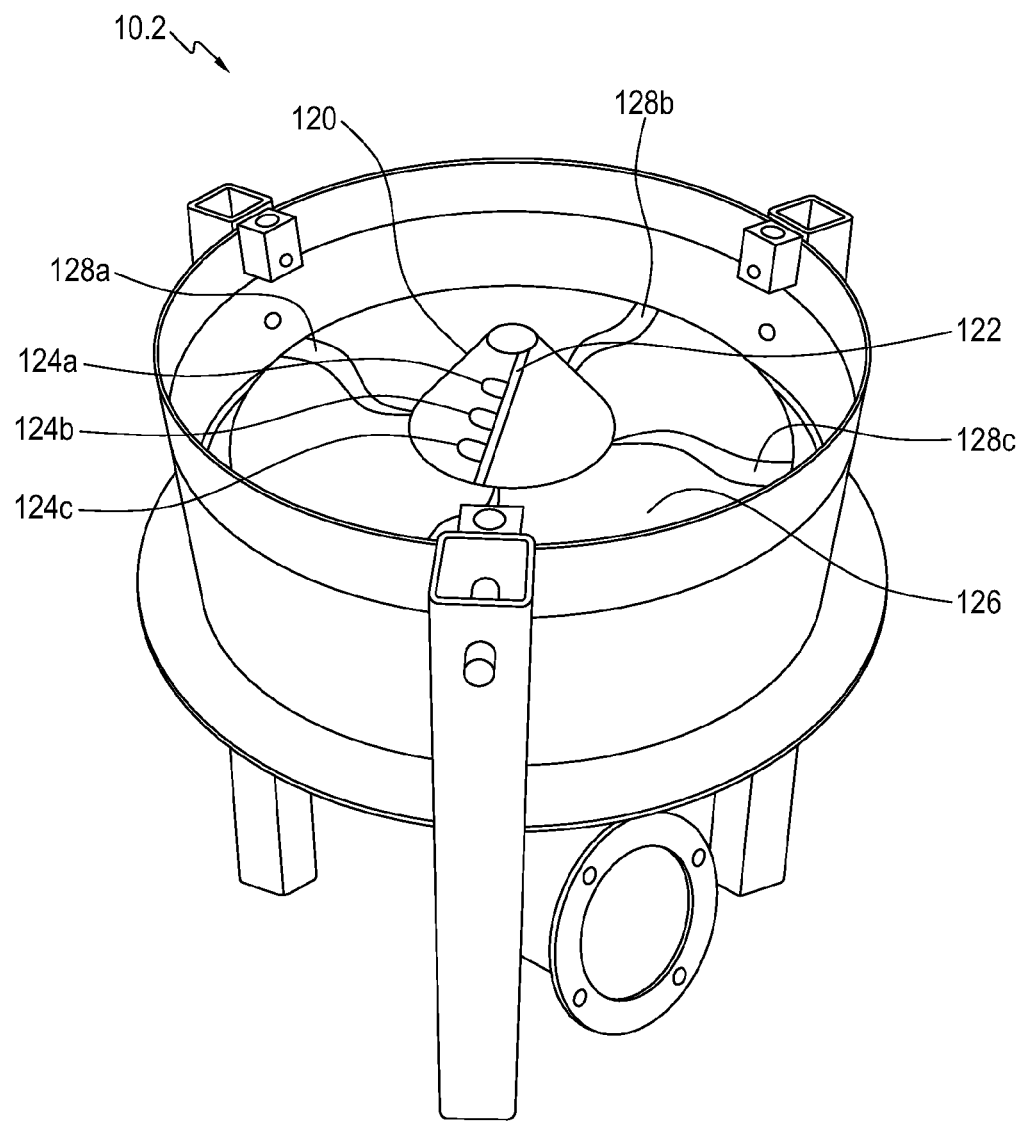
FIG. 15 is a side perspective, fragmentary view of a third embodiment of an improved rubber extracting device.

A third embodiment of the improved rubber extracting device 10.2 is shown in fragment in FIG. 15. The third embodiment of the rubber extracting device 10.2 is generally similar in structure and function to the first embodiment of the rubber extracting device 10 shown in FIGS. 1 to 4. However, the third embodiment of the device 10.2 is provided with a truncated cone 120 having both a groove 122 and a plurality of recesses 124a, 124b and 124c in a lateral surface thereof. In this example, the groove 122 extends from an apex of the truncated cone to a bottom edge thereof. The recesses 124a, 124b and 124c are elongate U-shaped recesses in this example and extend generally perpendicular to the groove 122. The groove and recesses facilitate movement of rubber-bearing plant material along the lateral surface of the truncated cone 122. The third embodiment of the device 10.2 is also provided with a disk 126 having a plurality of grooves 128a, 128b and 128c are a grinding surface thereof which facilitate the grinding of rubber-bearing plant material between the disks, only one of which is shown in FIG. 15. In this example, the grooves 128a, 128b and 128c are wave-shaped and are tapered such that they enlarge outwardly towards the outside of the disk 120.

Figure 16:
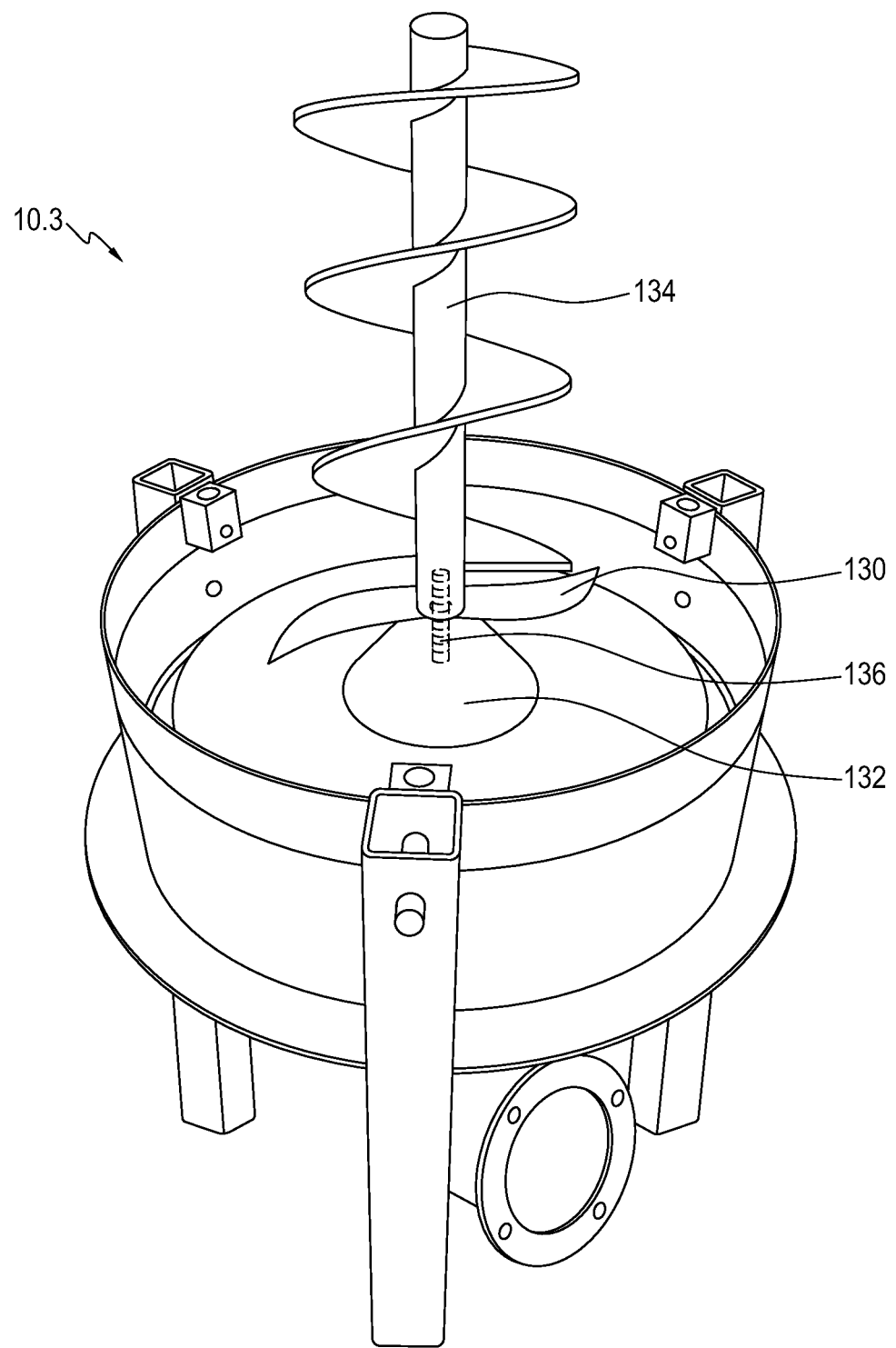
FIG. 16 is a side perspective, fragmentary view of a fourth embodiment of an improved rubber extracting device.

A fourth embodiment of the improved rubber extracting device 10.3 is shown in fragment in FIG. 16. The fourth embodiment of the rubber extracting device 10.3 is generally similar in structure and function to the first embodiment of the rubber extracting device 10 shown in FIGS. 1 to 4. However, the fourth embodiment of the device 10.3 is provided with a blade 130 disposed between the truncated cone 132 and the auger 134. A threaded member 136 mechanically couples the blade 130, truncated cone 132 and auger 134 together. This causes the blade 130 and auger 134 to rotate with the truncated cone 132 which is driven as described above for the first embodiment of the device. The rotating blade 130 cuts the rubber-bearing plant material to facilitate grinding of the rubber-bearing plant material.

It will be understood by a person skilled in the art that the terms "top" and "bottom" as used herein are used in relation to the position of the disks 30 and 32 as shown in FIG. 3. The disks 30 and 32 are typically horizontally without any external forces other than gravity. However, the disks 30 and 32 may also be used vertically. When oriented vertically, additional such as compression or pressure may also be applied to the disks to increase efficiency.

It will further be understood by a person skilled in the art that the device disclosed herein may be used to grind any organic material and the grinding of rubber-bearing plant material is only one example of a use for the device.

It will still further be understood by a person skilled in the art that many of the details provided above are by way of example only, and are not intended to limit the scope of the invention which is to be determined with reference to following claims.

What is claimed is:

1. A device for grinding organic material, the device comprising:
   a first grinding disk having a central opening;
   a second grinding disk disposed adjacent to and against the first grinding disk;
   a substantially cone shaped member disposed within the central opening of the first grinding disk, the cone shaped member having a base edge which engages a nip opening between the first grinding disk and the second grinding disk;
   a motor apparatus operatively engaging and rotating the cone shaped member and at least one of the first grinding disk and the second grinding disk; and
   a feed tube in communication with the central opening in the first grinding disk wherein the organic material fed through the feed tube is moved along a lateral surface of the cone shaped member and between the first grinding disk and the second grinding disk and wherein the feed tube is a telescoping feed tube which includes an outer feed tube and an inner feed tube, the outer feed tube being in communication with an input conduit and the inner feed tube having a lateral opening which is aligned with the input conduit to allow material to be fed into the device when the inner feed tube is substantially retracted within the outer feed tube and wherein the input conduit does not communicate with the inner feed tube and material cannot be fed to the device through the input conduit when the inner feed tube extends outwardly of the outer feed tube.

2. The device as claimed in claim 1 further including an auger disposed in the feed tube.

3. The device as claimed in claim 2 wherein the auger is mechanically coupled to the cone shaped member and rotates with the cone shaped member.

4. The device as claimed in claim 3 further including a blade disposed between the auger and the cone shaped member.

5. The device as claimed in claim 4 wherein the blade is mechanically coupled to the cone shaped member and rotates with the cone shaped member.

6. The device as claimed in claim 1 further including a scraper mounted on an apex of the cone shaped member.

7. The device as claimed in claim 1 wherein the input conduit extends angularly from the outer feed tube.

8. The device as claimed in claim 1 further including a groove in the lateral surface of the cone shaped member.

9. The device as claimed in claim 8 wherein the groove extends from an apex of the cone shaped member to a base edge thereof.

10. The device as claimed in claim 9 further including an elongate recess in the lateral surface of the cone shaped member extending generally perpendicular to the groove.

11. The device as claimed in claim 1 wherein the first grinding disk is a stationary top grinding stone and the second grinding disk is a rotatable bottom grinding stone.

12. A device for grinding organic material, the device comprising:
    a first grinding disk having a central opening;
    a second grinding disk disposed adjacent to and against the first grinding disk;
    a substantially cone shaped member disposed within the central opening of the first grinding disk;
    a motor apparatus operatively engaging and rotating the cone shaped member and at least one of the first grinding disk and the second grinding disk; and
    a scraper mounted on an apex of the cone shaped member, an output shaft being coupled to the scraper and causing the scraper to be moved along a lateral surface of the cone shaped member; and
    a telescoping feed tube in communication with the central opening in the first grinding disk, the telescoping feed tube including an outer feed tube and an inner feed tube, the outer feed tube being in communication with an input conduit and the inner feed tube having a lateral opening which is aligned with the input conduit to allow material to be fed to the device when the inner feed tube is substantially retracted within the outer feed tube, wherein the input conduit cannot communicate with the inner feed tube and material cannot be fed to the device through the input conduit when the inner feed tube extends outwardly of the outer feed tube, and wherein the organic material fed from the telescoping feed tube is moved along the lateral surface of the cone shaped member and between the first grinding disk and the second grinding disk.

13. The device as claimed in claim 12 wherein the first grinding disk is a stationary top grinding stone and the second grinding disk is a rotatable bottom grinding stone, and the second grinding stone has grooves on a grinding surface thereof.

14. A device for grinding organic material, the device comprising:
    a first grinding disk having a central opening;
    a second grinding disk disposed adjacent to and against the first grinding disk;
    a substantially cone shaped member disposed within the central opening of the first grinding disk,
    a groove extending along a lateral surface of the cone shaped member from an apex of the cone shaped member to a base edge of the cone shape member;
    an elongate recess in the lateral surface of the cone shaped member, the elongate recess extending generally perpendicular to the groove;
    a motor apparatus operatively engaging and rotating the cone shaped member and at least one of the first grinding disk and the second grinding disk; and
    a feed tube with an auger disposed therein in communication with the central opening in the first grinding disk wherein the organic material fed from the feed tube is moved along the lateral surface of the cone shaped member and between the first grinding disk and the second grinding disk.

15. The device as claimed in claim 14 wherein the auger is mechanically coupled to the cone shaped member and rotates with the cone shaped member.

16. The device as claimed in claim 14 wherein the first grinding disk is a stationary top grinding stone and the second grinding disk is a rotating bottom grinding stone.

* * * * *